(12) United States Patent
Yamamura et al.

(10) Patent No.: US 7,461,851 B2
(45) Date of Patent: Dec. 9, 2008

(54) VEHICLE, WHEEL SUSPENSION DEVICE AND METHOD OF ASSEMBLING VEHICLE

(75) Inventors: Takashi Yamamura, Shizuoka (JP); Katsuhisa Shimizu, Shizuoka (JP); Minoru Seto, Newnan, GA (US); Tomoaki Ooishi, Newnan, GA (US); Craig Smith, Newnan, GA (US)

(73) Assignees: Yamaha Hatsudoki Kabushiki Kaisha, Shizuoka (JP); Yamaha Motor Manufacturing Corporation, Newnan, GA (US)

( * ) Notice: Subject to any disclaimer, the term of this patent is extended or adjusted under 35 U.S.C. 154(b) by 378 days.

(21) Appl. No.: 11/127,523

(22) Filed: May 12, 2005

(65) Prior Publication Data

US 2005/0253353 A1 Nov. 17, 2005

Related U.S. Application Data

(60) Provisional application No. 60/570,639, filed on May 13, 2004.

(51) Int. Cl.
*B60G 3/18* (2006.01)
*B62D 21/12* (2006.01)

(52) U.S. Cl. .............................. 280/124.135; 280/798; 180/311

(58) Field of Classification Search ................. 280/781, 280/785, 788, 798, 124.134, 124.135, 124.136; 180/210, 311, 312
See application file for complete search history.

(56) References Cited

U.S. PATENT DOCUMENTS

| | | | | |
|---|---|---|---|---|
| 4,531,761 A | * | 7/1985 | von Sivers | ............. 280/785 |
| 4,657,271 A | * | 4/1987 | Salmon | ............ 280/124.139 |
| 4,662,467 A | * | 5/1987 | Arai et al. | ............. 180/210 |
| 4,811,812 A | * | 3/1989 | Cassese | ............. 180/295 |
| 5,495,905 A | * | 3/1996 | Fini, Jr. | ............. 180/21 |
| 5,934,397 A | * | 8/1999 | Schaper | ............. 180/65.2 |
| 5,975,624 A | * | 11/1999 | Rasidescu et al. | ........ 296/203.01 |
| 6,085,859 A | * | 7/2000 | Alderson | ............. 180/377 |
| 6,412,856 B1 | * | 7/2002 | Kajikawa et al. | ........ 296/203.01 |
| 6,547,027 B1 | * | 4/2003 | Kalhok et al. | ............. 180/312 |
| 6,702,058 B2 | * | 3/2004 | Ishii et al. | ............. 180/311 |

(Continued)

FOREIGN PATENT DOCUMENTS

JP 3069309 7/2000

*Primary Examiner*—Paul N. Dickson
*Assistant Examiner*—Joseph Rocca
(74) *Attorney, Agent, or Firm*—Keating & Bennett, LLP

(57) ABSTRACT

A vehicle includes a wheel suspension device on a right side and a wheel suspension device on a left side, with the right and left side wheel suspension devices being connected to each other through a rear frame mounted on a body frame. The right and left side wheel suspension devices include a lower arm supported at an inner end of the rear frame so as to extend outward and so as to be pivotally movable in a vertical direction. The right and left side wheel suspension devices also include an upper arm connected to the outer end of the lower arm through a wheel-supporting knuckle and so as to extend outward from the knuckle. The wheel suspension devices are provided with a rear cushion unit connected at one end to the swinging side end of one of the lower and upper arm members. At least one of the inner end of the upper arm and the other end of the rear cushion unit is supported on the rear frame so as to be pivotally movable.

13 Claims, 10 Drawing Sheets

U.S. PATENT DOCUMENTS

| | | |
|---|---|---|
| 6,767,022 B1 * | 7/2004 | Chevalier ............. 280/124.136 |
| 2001/0048207 A1 * | 12/2001 | Handa ................. 280/124.135 |
| 2003/0000764 A1 * | 1/2003 | Seiki .......................... 180/376 |

* cited by examiner

VEHICLE, WHEEL SUSPENSION DEVICE AND METHOD OF ASSEMBLING VEHICLE

This application claims the benefit of U.S. Provisional Application No. 60/570,639, filed May 13, 2004.

BACKGROUND OF THE INVENTION

1. Field of the Invention

The present invention relates to a vehicle such as an automobile or an off-road vehicle such as an off-road car and a golf cart, and also relates to a wheel suspension device for the vehicle and to a method of assembling the vehicle.

2. Description of the Related Art

A known wheel suspension device of an automobile or an off-road vehicle includes a four-wheel independent suspension system in which front and rear wheels are each held by an independent suspension device of a double wishbone type. This suspension system has lower and upper arms extending laterally from a total of four locations on both sides in the front and both sides in the rear of a body frame, and knuckles connected to the forward ends of both of these arms for supporting wheels for rotation.

Each of the upper and lower arms in each location has a body frame side end that is wider than a knuckle side end and the body frame side end is connected to the body frame at two spaced-apart locations for pivotal movement in the vertical direction. Each of the knuckle side ends of the upper and lower arms on both sides in the rear is connected to the knuckle at one location or two spaced-apart locations for pivotal movement in the vertical direction. On the other hand, the knuckle side ends of the upper and lower arms on both sides in front are connected by being fitted to ball joints provided on the knuckles, respectively, with the knuckles being rotatable relative to the upper and lower arms in both vertical and lateral directions. Also, at least one cushion unit is disposed at each of the two sides in the front and the at least one cushion unit is connected at one end to at least one of the upper and lower arms for pivotal movement about its longitudinal shaft. The cushion unit includes a compression coil spring and/or a shock absorber arranged parallel to the compression coil spring. The other end of the at least one cushion unit is connected to the body frame for pivotal movement about the longitudinal shaft.

In the knuckle on the side of at least one drive wheel of the front and rear wheels, a wheel support shaft penetrates the knuckle in the lateral direction and is supported for rotation. The wheel support shaft is connected at its body frame side end to a drive shaft and a wheel is fixed to the wheel support shaft at the end on the opposite side from the body frame side end with respect to the knuckle. The drive shaft is provided at both ends with universal joints and is telescopic in the axial direction. This allows a rotational drive force to be transmitted satisfactorily to a wheel from a drive source disposed on the body frame even if the wheel makes a swinging movement or is turned about the vertical shaft with respect to the body frame.

Also, a device of a four wheel independent suspension system shown in FIG. 3 and FIG. 4 of JP-B 3069309, for example, is of a four-wheel drive type, in which at each of a total of four locations on both sides at the front of the body frame and both sides in the rear of the body frame, the lower arm arrangement is replaced by a tension rod and a drive wheel having universal joints disposed at both ends, and the cushion unit is connected at one end to an upper arm and at the other end to the body frame for pivotal movement about the longitudinal shaft, respectively.

The vehicle equipped with such a wheel suspension device as described above is manufactured by the so-called flow operation. That is, vehicles of this type are manufactured in such a manner that body frames are supplied to a production line and parts are mounted to the body frames successively.

Since, in the vehicle equipped with a conventional wheel suspension device described above, parts such as the upper and lower arms and cushion units of the wheel suspension device, and wheel driving reduction gears, are mounted to the body frame on a production line, a lot of work-hours are required for the assembly work to be performed on the production line. In addition, auxiliary work must be performed on the production line, such as connecting knuckles to the upper and lower arms and connecting the reduction gears to axles provided in the knuckles.

Therefore, a long production line is needed and if some problem occurs such as a shortage of parts, it will impact the whole production line, resulting in a large decrease in production efficiency. Also, if the quantity of the production lot becomes smaller, the frequency of the set-up change is significantly increased, so that a large decrease in production efficiency occurs if the production line is long. Therefore, in some cases, assembling costs become much higher than expected.

Further, in the vehicle equipped with independent suspension type wheel suspension devices, when a wheel travels over irregularities on the road during travel, shocks are transmitted to the body frame through the upper and lower arms and cushion units. However, riding comfort is not necessarily improved, depending on the shock-absorbing property of the cushion unit. In addition, since shocks are applied to the body frame from the suspension device in each wheel as described above, portions of the body frame to which the wheel suspension devices are connected must be stronger and more rigid than other portions.

Further, in the vehicle equipped with the above-described conventional wheel suspension devices, unless all the constituent members of the wheel suspension device are formed with very high accuracy and all the wheel suspension device-connecting portions of the body frame are formed with very high accuracy, it is impossible for the wheel suspension device to be mounted to the body frame. Therefore, in some cases, the foregoing conventional vehicle increases costs in forming the foregoing constituent members and suspension device-connecting portions.

SUMMARY OF THE INVENTION

In order to overcome the problems described above, preferred embodiments of the present invention provide a wheel suspension device for a vehicle such as an automobile or off road vehicle that greatly improves the production efficiency of assembly of a vehicle equipped with independent suspension type wheel suspension devices.

According to a preferred embodiment of the present invention, a vehicle includes, at the left and right sides, wheel suspension devices supporting a vehicle body on a body frame. The body frame includes a main body frame and a separate sub-frame connected to the body frame. The wheel suspension device includes a sub-frame, left and right lower arms each having a first end supported on the sub-frame for pivotal movement in the vertical direction and a second end extending outward from the side of the sub-frame, left and right knuckles each connected to the outer end of the lower arm for pivotal movement in the vertical direction and supporting a wheel for rotation, left and right upper arms each having a first end connected for pivotal movement in the vertical direction to the knuckle at a position above the connecting portion of the knuckle and the lower arm and extending inward from the first end, and left and right cushion units each connected at a first end for pivotal movement relative to a swinging member including the upper and lower arms, and two pivot shafts connected to the knuckle and capable of moving up and down relative to the body frame. Also, second ends of the upper arm and the cushion unit are connected to the body frame and at least one of the second ends is connected to the sub-frame.

As a result of this unique structure, a wheel suspension unit having a fixed shape can be assembled in a sub-production line separate from a main production line in which each member is assembled to a body frame, thus decreasing assembling work-hours in the main line. Therefore, the vehicle according to preferred embodiments of the present invention can be produced at low cost because of higher production efficiency and decreased manufacturing costs. Also, the wheel suspension unit having a fixed shape is easy to handle and work-hours during assembly of the body frame can be minimized.

According to a preferred embodiment of the present invention, the sub-frame is connected detachably to the main body frame. This allows the wheel suspension device to be replaced in the form of a unit at the time of aftermarket maintenance and inspection or in a production line.

According to a preferred embodiment of the present invention, the second ends of both the upper arm and the cushion unit are each connected to the sub-frame. This allows further reduction in required work-hours in a main assembly line.

According to a preferred embodiment of the present invention, a shock-absorbing member preferably made of rubber is provided in a connecting portion that connects the sub-frame to the main body frame. This allows shocks transmitted from the sub-frame of a wheel suspension unit to the body frame to be minimized by the shock-absorbing member. Therefore, a vehicle having a satisfactory riding comfort can be provided. Also, since shocks transmitted from the wheel suspension unit to the body frame are decreased, the suspension device-connecting portion of the body frame can be constructed to have the same strength and rigidity as the other portions. This allows for cost reduction in manufacturing the body frame. Further, since deformation of the shock-absorbing member allows dimensional errors of the sub-frame and body frame to be offset, the sub-frame and the sub-frame mounting portion of the body frame are produced at lower cost while the wheel suspension device can be assembled properly to the body frame.

According to a preferred embodiment of the present invention, if the second end of the upper arm or the cushion unit is not connected to the sub-frame, the second end is connected to the main body frame. In at least one of the upper arm and the cushion unit, the second ends of which are connected to the main body frame, a shock-absorbing member preferably made of rubber is provided in at least one of connecting portions at the first end and at the second end, and a shock-absorbing member preferably made of rubber is provided in the connecting portion that connects the sub-frame to the main body frame.

As a result, even if the sub-frame is not connected to a main body frame through a shock-absorbing member but connected directly to the main body frame, shocks transmitted to the main body frame can be absorbed and minimized by the shock-absorbing member. Therefore, even if a seat is mounted on the main body frame, a vehicle with satisfactory riding comfort can be provided.

According to still another preferred embodiment of the present invention, since a power distribution device including an input shaft connected to an engine, a pair of left and right output shafts each connected to the respective left and right wheels, a gear device for transmitting the rotation of the input shaft to the output shafts, and a casing member for supporting the gear device, the input shaft and output shafts for rotation, is provided on the sub-frame, the required work-hours in the main assembly production line can be further decreased.

According to still another preferred embodiment of the present invention, since a knuckle supports a front wheel rotatably and is connected to the second ends of the upper and lower arms for pivotal movement in the vertical direction and in the lateral direction, and a steering device is connected to the knuckle, the required work-hours in the main assembly production line can be further decreased, as in the foregoing arrangement.

These and other features, elements, characteristics, steps and advantages of the present invention will become more apparent from the following detailed description of preferred embodiments of the present invention with reference to the attached drawings.

DETAILED DESCRIPTION OF PREFERRED EMBODIMENTS

First Preferred Embodiment

Now, preferred embodiments of a vehicle, a wheel suspension device and a method of assembling the vehicle according to the present invention will be described in detail with reference to FIG. 1-FIG. 7. Here, the vehicle according to preferred embodiments of the present invention is exemplified by an off-road vehicle whose rear wheel suspension device embodies the wheel suspension device according to various preferred embodiments of the present invention. However, the present invention is not limited to this type of vehicle and is applicable to many different types of vehicles including off-road vehicles such as ATVs or golf carts, automobiles, and other motorized vehicles.

Figure 1:
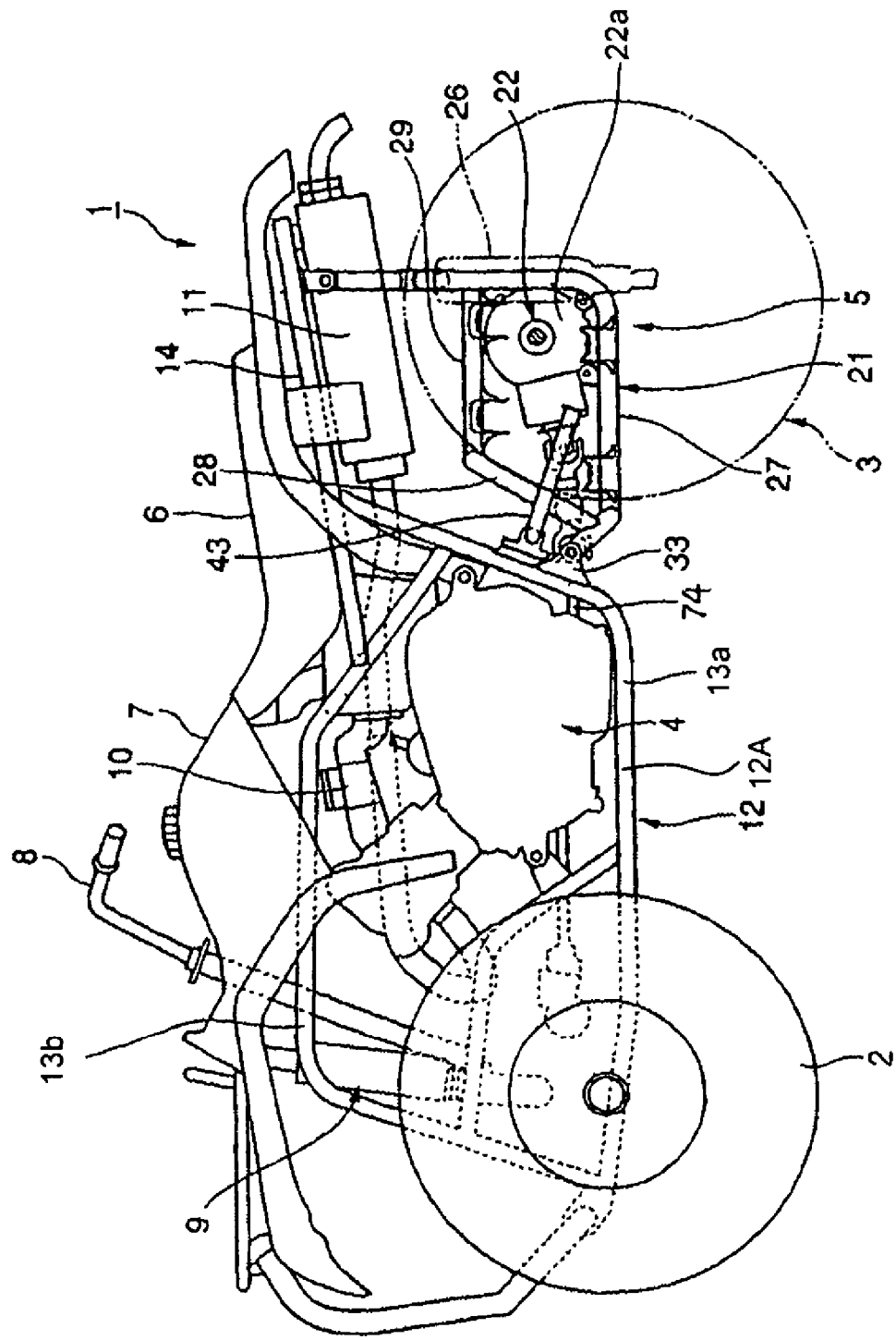
FIG. 1 is a side view of an off-road vehicle according to a preferred embodiment of the present invention.

In the figures, a reference numeral 1 designates an off-road running vehicle according to the present preferred embodiment. The vehicle 1 is preferably a four-wheel drive vehicle with two front wheels 2 and rear wheels 3 driven by an engine 4. As seen in FIG. 1, the vehicle 1 includes a rear wheel suspension device 5, a seat 6 for a rider to sit astride, a fuel tank 7, steering handlebars 8, an independent suspension type front wheel suspension device 9, a carburetor 10, and a muffler 11, respectively.

The engine 4 is mounted on a body frame 12 such that it is located in an approximately central portion of the body in the longitudinal and the lateral direction. The body frame 12 preferably includes a main body frame 12A, and a rear frame 21, also referred to as a sub-frame, connected to the main body frame 12. The main body frame 12A primarily includes a pair of left and right lower pipe members 13a passing under the engine 4 and extending longitudinally, a pair of left and right upper pipe members 13b passing above the engine 4 and extending longitudinally, a pair of left and right seat rails 14 connected to the rear ends of the upper and lower pipe members 13a, 13b for supporting the seat 6. The rear frame 21 constitutes part of a rear wheel suspension device 5 disposed behind the lower pipe member 13a and below the seat rail 14.

Figure 2:
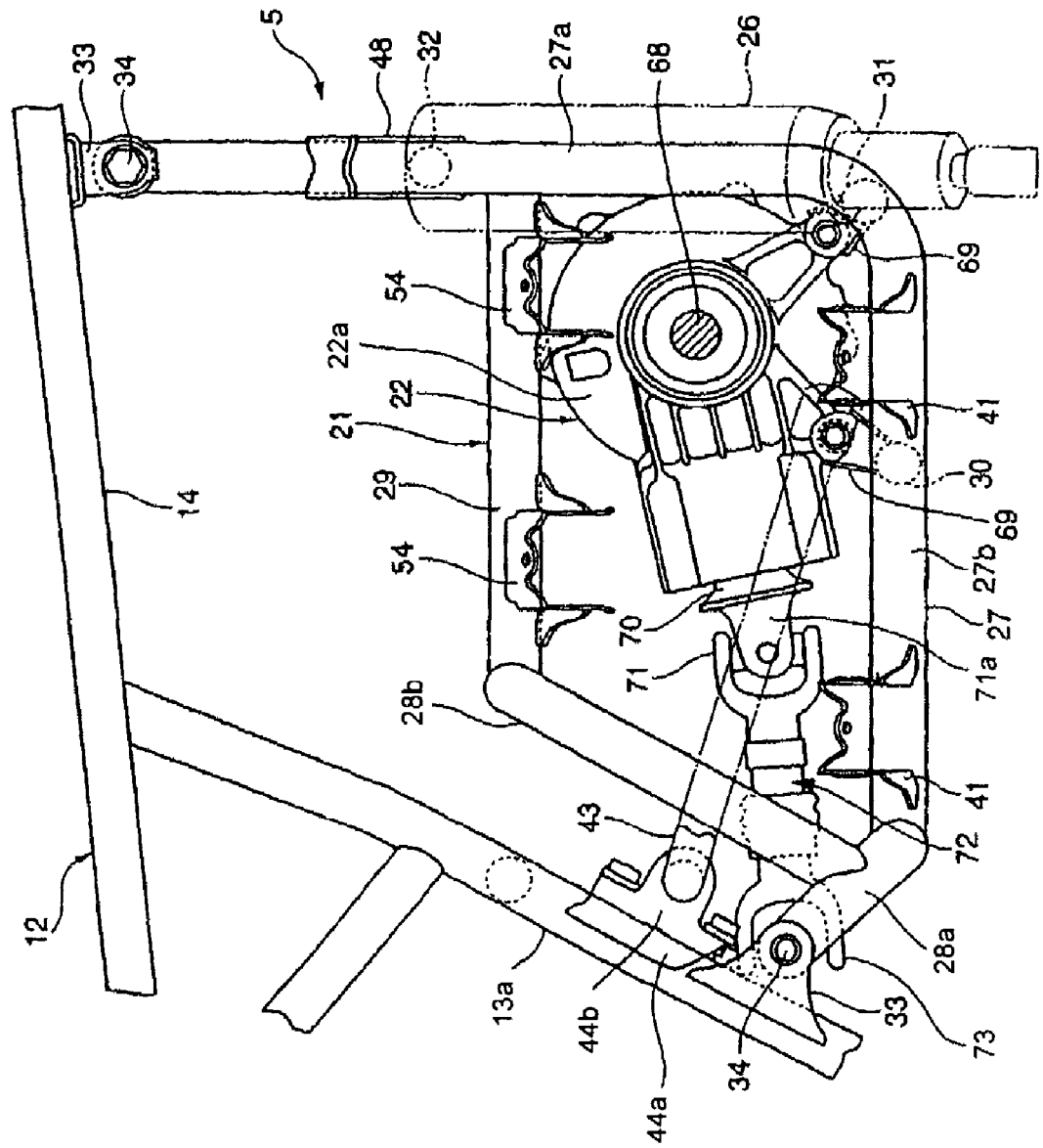
FIG. 2 is a side view showing a rear wheel suspension device on an enlarged scale.
Figure 3:
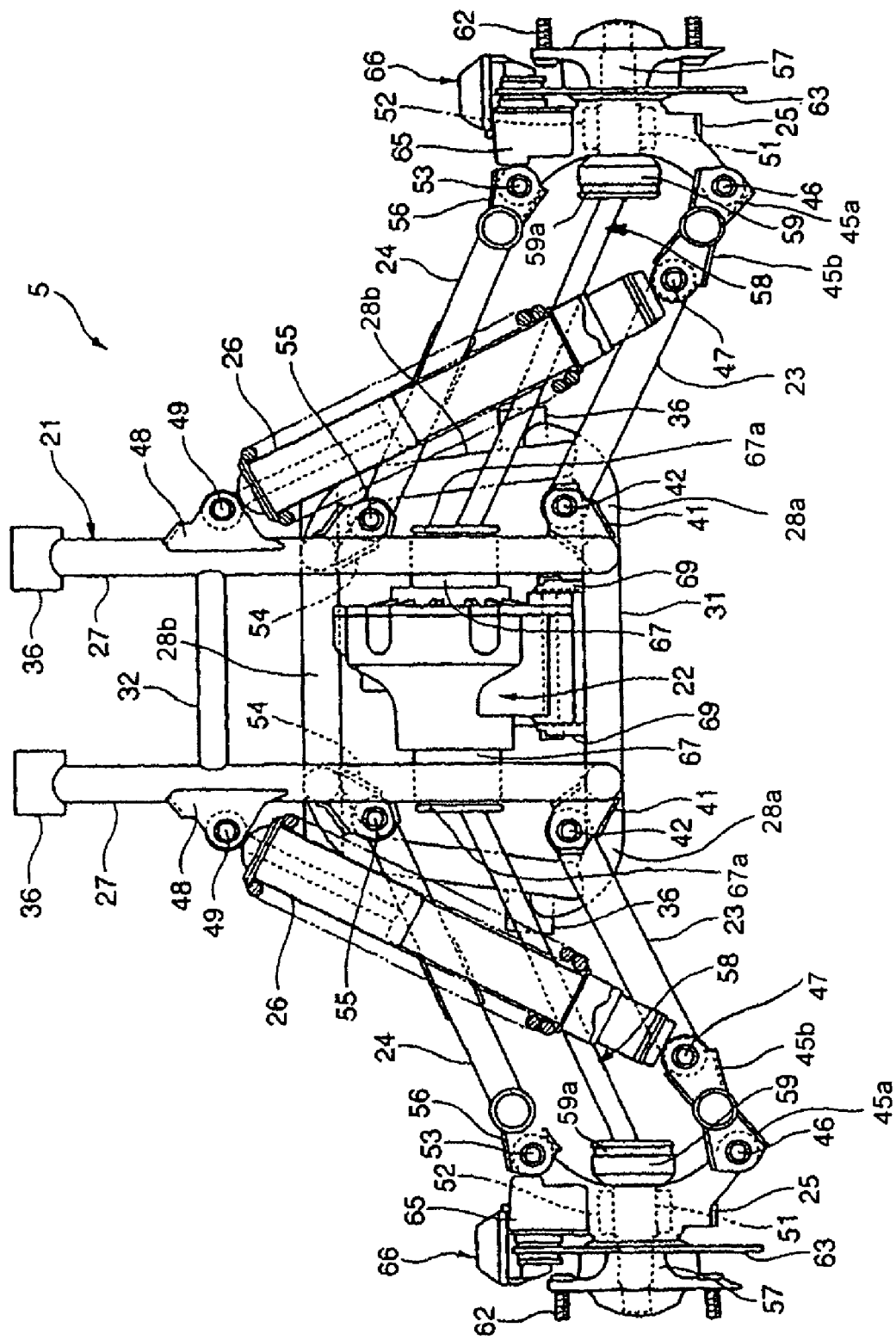
FIG. 3 is a rear view of the rear wheel suspension device.
Figure 4:
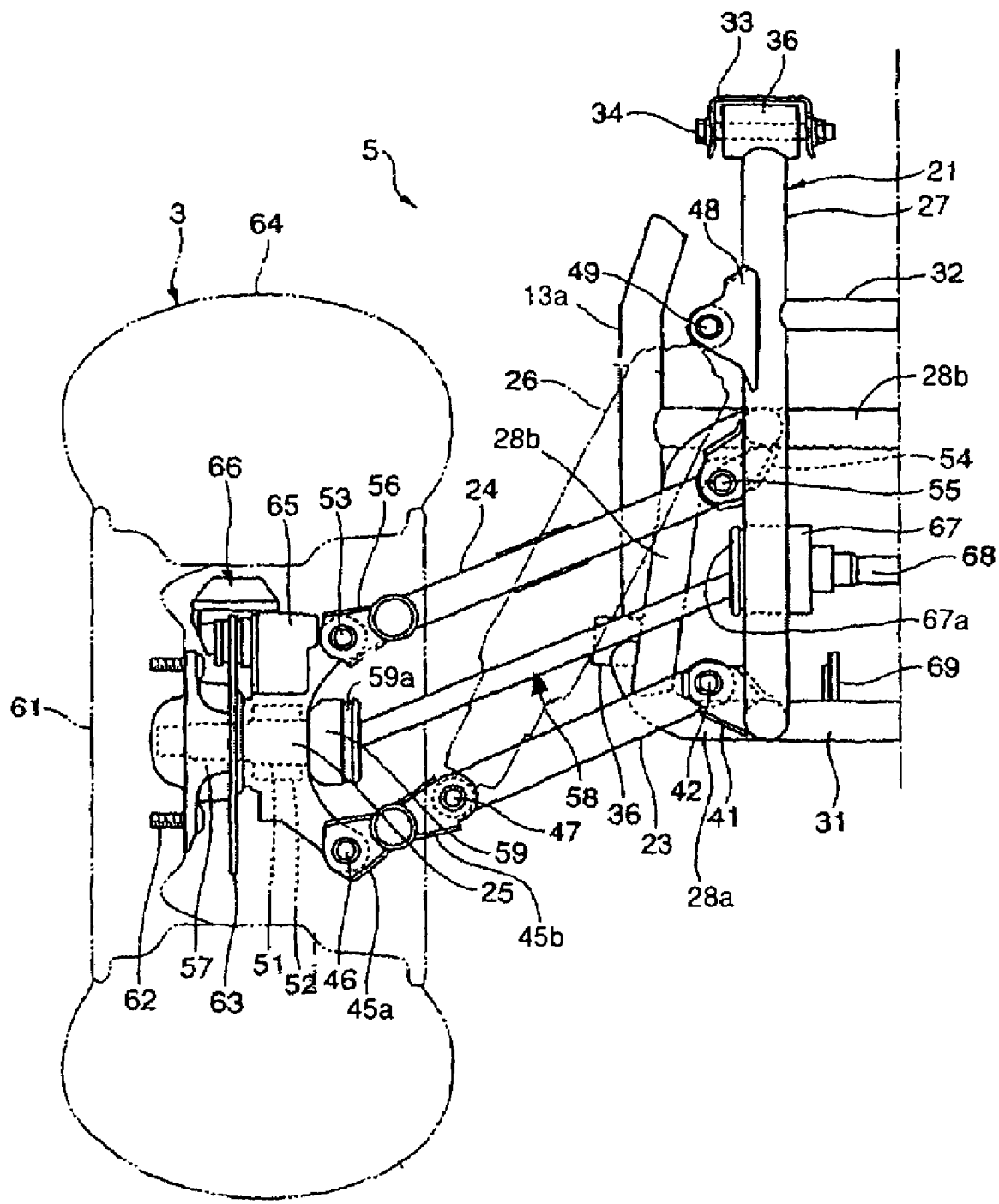
FIG. 4 is a rear view showing the left half of the rear wheel suspension device on an enlarged scale.

The rear wheel suspension device 5, as shown in FIG. 2-FIG. 4, includes a rear frame 21 mounted to the pipe members 13a, 13b and seat rails 14 of the body frame 12 through a mounting structure described later, a rear reduction gear device 22 mounted on the rear frame 21, a pair of left and right lower arms 23, upper arms 24, knuckles 25, rear cushion units 26, and other elements.

Figure 7:
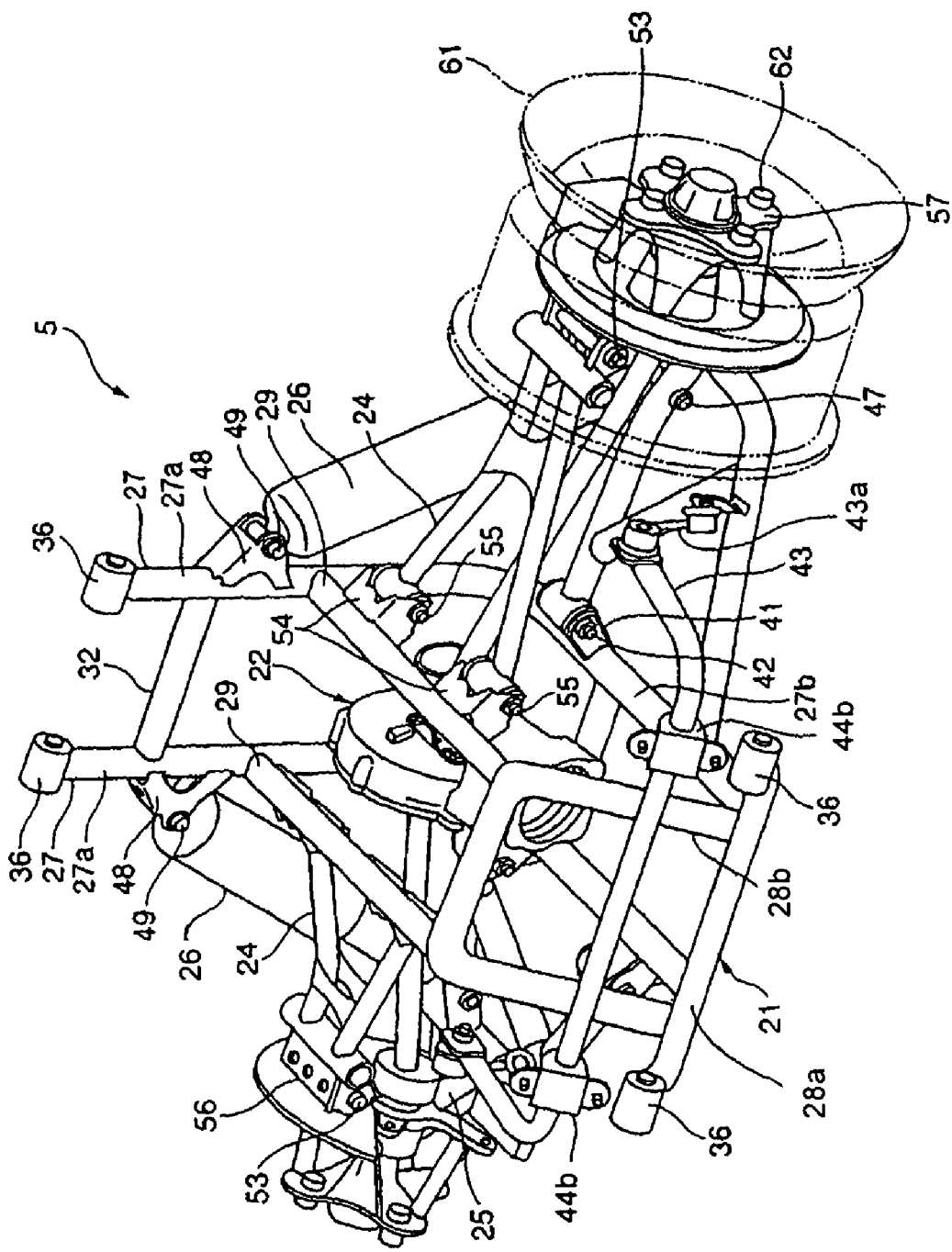
FIG. 7 is a perspective view showing the construction of the rear wheel suspension device.

The rear frame 21 is preferably formed from a plurality of pipes that are preferably welded together. Specifically, the rear frame 21, as shown in FIG. 1, FIG. 2 and FIG. 7, includes a pair of left and right main pipes 27 each preferably having a substantially L-shaped configuration in profile and connected at both ends to the body frame 12, a first cross member 28a connecting the forward ends of the main pipes 27 and bent forward at both ends, a second cross member 28b, in the downwardly-opening C-shape viewed from the front, connected to the first cross member 28a, a pair of left and right sub-pipes 29 extending rearward from the upper end portions of the second cross member 28b and each connected at its rear end to a vertically extending portion 27a of the main pipe 27, third and fourth cross members 30, 31 for connecting longitudinally extending portions 27b of the left and right main pipes 27, 27 to each other, and a fifth cross member 32 for connecting the vertically extending portions 27a of the main pipes 27, 27. A sub-frame referred to in various preferred embodiments of the present invention is constituted by this rear frame 21.

Figure 6:
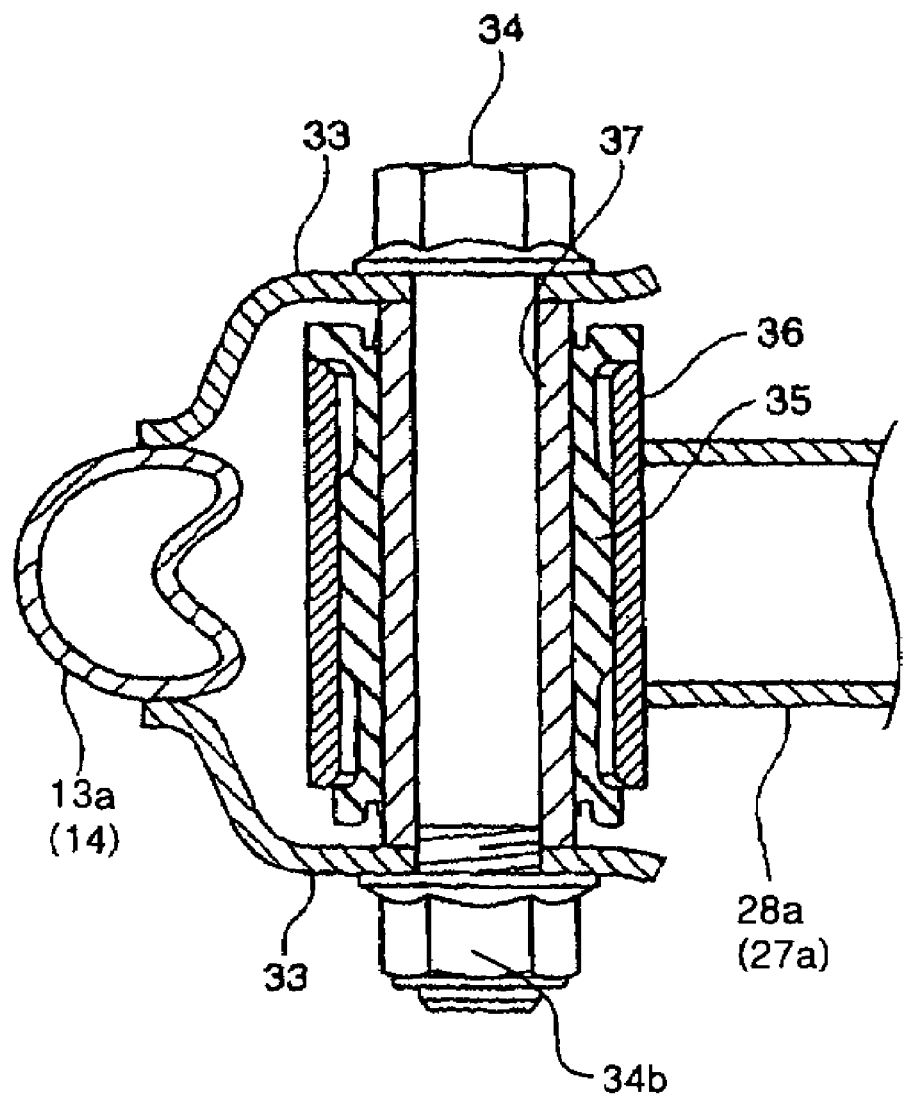
FIG. 6 is a sectional view of the mounting portion of the rear arm to the body frame, taken along the line VI-VI of FIG. 2.

The connecting portion of the rear frame 21 that is connected to the body frame 12, as shown in FIG. 6, has a structure in which the upper ends of the pair of left and right main pipes 27 and both ends of the first cross member 28a are connected, through fixing bolts 34, rubber cushioning members 35 and the like, to support plates 33 welded at four locations to the rearward under sides of the left and right seat rails 14 of the body frame 12 and to the rear sides of the left and right pipe members 13a at the rear.

Laterally extending pipes 36 are welded to the upper ends of the pair of main pipes 27 and both ends of the first cross member 28a. The outside circumferential portion of the rubber cushioning member 35, preferably having a substantially a cylindrical shape, is bonded to the pipe 36 at the inside circumferential portion. Also, the outside circumferential portion of a substantially cylindrical collar 37, which is penetrated by the fixing bolt 34, is bonded to the rubber cushioning member 35 at the inside circumferential portion thereof. The collar 37 is long enough to be fitted between the pair of left and right support plates 33. The rubber cushioning member 35 and the pipe 36 are constructed such that their axial lengths are less than that of the collar 37.

That is, connection of the rear frame 21 and the body frame 12 is performed by first inserting the rubber cushioning member 35 and collar 37 into the pipe 36, then placing the pipe 36 between the support plates 33 and fastening the support plates 33 to the collar 37 with a fixing bolt 34 and a nut 34b fitted on the fixing bolt 34. This connecting structure is preferably adopted in all four connecting portions of the main pipes 27 that are connected to the body frame 12. That is, since the rear frame 21 is mounted to the body frame 12 through this unique connecting structure, the rear frame 21 is supported elastically on the body frame 12. This rubber cushioning member 35 constitutes a shock-absorbing member preferably made of rubber referred to in the description of various preferred embodiments of the present invention.

The longitudinally extending portion 27b of the main pipe 27 of the rear frame 21, as shown in FIG. 3, FIG. 4 and FIG. 7, has two supporting brackets 41 preferably welded thereto in longitudinally spaced relation, and a lower arm 23 is connected to the extending portion through the supporting brackets 41. The lower arm 23, as shown in FIG. 5 and FIG. 7, is preferably formed into the V-shape in plan view and protrudes laterally, and extends outwardly from the main pipe 27, with the ends of the two sides of the V-shape (ends on the body frame side) connected to supporting brackets 41 through support shafts 42 for pivotal movement in the vertical direction, respectively.

One end of a stabilizer 43 is connected to the lower arm 23 of the present preferred embodiment, as shown in FIG. 7. The stabilizer 43 connects the left and right lower arms 23 through a link member 43a (see FIG. 7), and is mounted to mounting stays 44a welded to the lower pipe members 13a of the body frame 12 through mounting brackets 44b. The mounting brackets 44b are mounted in advance to the stabilizer 43 for rotational movement for the attachment to the body frame. The mounting stays 44a may be designed such that they are welded to the second cross member 28b so that the left and right mounting brackets 44b are fixed to the mounting stays 44a. In this case, the stabilizer 43 can also be assembled in a sub-production line in advance as part of the rear wheel suspension device 5. The stabilizer 43 prevents the left and right wheels from moving in the vertical direction completely independently and allows a certain amount of their associated vertical movement, and the degree of the associated movement can be adjusted by setting the torsional elasticity.

Figure 5:
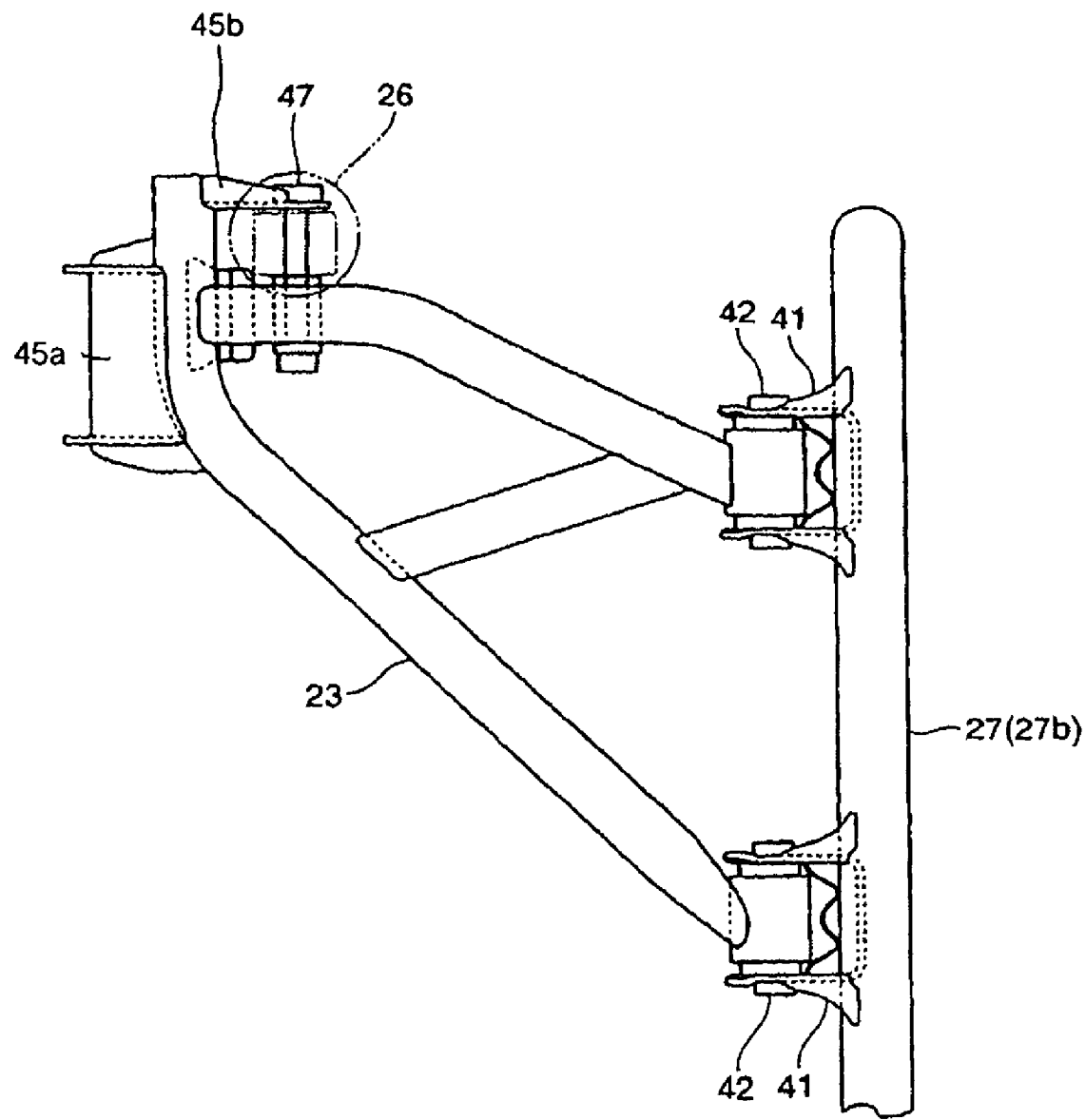
FIG. 5 is a bottom view of a left lower arm and a portion of a rear frame.

Two connecting brackets 45a, 45b are welded to the wheel side end of the lower arm 23, as shown in FIG. 3-FIG. 5, and the lower end of the knuckle 25 is connected to the bracket 45a through a longitudinally disposed support shaft 46 for pivotal movement. Also, at the wheel side end of the lower arm 23, the lower end of the rear cushion unit 26 is connected to the bracket 45b, located further inward toward the rear frame than the bracket 45a, through a longitudinally disposed support shaft 47 for pivotal movement. The rear cushion unit 26 preferably includes a compression coil spring and/or a shock absorber disposed substantially parallel to the compression coil spring and is connected at its upper end to the upper end of the vertically extending portion 27a of the main pipe 27 and mounted between the main pipe 27 and the lower arm 23. The upper end of the rear cushion unit 26 is connected to a supporting bracket 48 welded to the vertically extending portion 27a through a longitudinally disposed support shaft 49 for pivotal movement.

The knuckle 25 which supports an axle 51 of the rear wheel 3 through a bearing 52 for rotation, is arranged to extend upwardly from its lower end connected to the lower arm 23, and connected at its upper end to an upper arm 24 (described later) through a longitudinally disposed support shaft 53 for pivotal movement.

The upper arm 24, as shown in FIG. 7, similar to the lower arm 23, preferably has a substantially L-shaped configuration in plan view protruding outwardly, and extends toward the wheel from the sub-pipe 29, with the ends of the two sides of the V-shape (ends on the body frame side) connected to supporting brackets 54 on the sub-pipe 29 through longitudinally disposed support shafts 55 for pivotal movement in the vertical direction, respectively.

A connecting bracket 56 is welded to the wheel side end of the upper arm 24, as shown in FIG. 3 and FIG. 4, and the upper end of the knuckle 25 is connected to the bracket 56 through the longitudinally disposed support shaft 53 for pivotal movement.

The axle 51 supported by the knuckle 25 is arranged to penetrate the knuckle 25 laterally. A hub 57 is fixed to the outer end of the body, and a transmission shaft 58 is connected to the inner end of the body through a universal joint 59.

The hub 57 is provided with bolts 62 for mounting a wheel 61 (see FIG. 4 and FIG. 7) of the rear wheel 3, and a brake disk 63 is fixed thereto. The rear wheel 3 includes the wheel 61 and a low pressure balloon type or ordinary pressure tire 64 fitted on the wheel.

A brake caliper 65 (see FIG. 3 and FIG. 4) for braking the brake disk 63 is preferably a hydraulic type and mounted to the knuckle 25 at the upper end. A rear brake device 66 having the brake caliper 65 and the brake disk 63 is designed such that it is actuated when a rider sitting on the seat 6 operates a brake pedal (not shown). A master cylinder (not shown) of the rear brake device 66 is disposed in the vicinity of the brake pedal and connected to the brake caliper 65 through an oil pressure pipe. Telescopic transmission shafts 58 are disposed on both left and right sides of a rear reduction gear device 22, and each of the telescopic transmission shafts 58 has universal joints 59, 67 at both ends thereof. The transmission shaft 58 has, at one end, the universal joint 59 having an output end 59a connected to the inner end of the axle 51 and, at the other end, the universal joint 67 having an input end 67a connected to an output shaft 68 (see FIG. 4) of the rear reduction gear device 22.

The rear reduction gear device 22 is located in the rear frame 21 laterally centrally of the vehicle, and mounted to third and fourth cross members 30, 31 of the rear frame 21 through fixing brackets 69 and rubber cushioning members (not shown). This rear reduction gear device 22 constitutes a power distribution device referred to in the description of preferred embodiments of the present invention.

A telescopic drive shaft 72 is located forwardly of the rear reduction gear device 22 and is provided at both ends thereof with universal joints 71, 73. The drive shaft 72 has, at one end, the universal joint 71 having an output end 71a connected to an input shaft 70 of the rear reduction gear device 22 and, at the other end, the universal joint 73 having an input end connected to a rear wheel driving output shaft 74 (see FIG. 1) of the engine 4.

The rear reduction gear device 22 includes an input shaft 70 having one end connected to the output end 71a of the universal joint 71, a pinion (not shown) mounted to the tip of the other end of the input shaft 70, a casing supporting the middle of the input shaft 70 for rotation, an output shaft 68 arranged substantially perpendicular to the extension line of the input shaft 70, supported at both sides by the casing for rotation and connected, at its leading ends protruding laterally from the casing, to the input ends 67a of the universal joints 67, respectively, and a driven bevel gear supported fixedly to the output shaft 68 within the casing and meshing with the pinion.

The off-road running vehicle 1 described above, is assembled such that each member is assembled to the body frame 12 in an unillustrated main production line. The rear wheel suspension device 5 of this off-road vehicle 1 is assembled as a rear wheel suspension unit in a sub-production line provided separate from the main production line, and after assembling, it is carried in the main production line to be mounted to the body frame 12.

The rear wheel suspension device 5 is assembled as a rear wheel suspension unit, specifically by assembling the lower arm 23, upper arm 24, knuckle 25, rear cushion unit 26, stabilizer 43, hub 57, brake disk 63 and parts of the hydraulic system of the rear brake device 66 (including the master cylinder connected to the brake caliper 65), rear reduction gear device 22 having the output shaft 68 and input shaft 70 assembled thereto in advance, complete transmission shaft 58 having universal joints 59, 67 assembled in advance, and other elements, assembled to the rear frame 21 in the sub-production line. Therefore, the rear wheel suspension unit is mounted, at both ends of the main pipes 27, to the pipe members 13a, 13b and seat rails 14 of the body frame 12 with rubber cushioning members 35 and fixing bolts 34.

Therefore, since during assembly of the off-road vehicle 1, the rear wheel suspension device 5 can be assembled in a sub-production line simultaneously with a main production line, assembling work-hours in the main production line can be decreased compared to a conventional vehicle in which all members of the rear wheel suspension device are assembled to the body frame in a main production line.

Also, since the rear wheel suspension unit, which is formed with all the constituent members of the rear wheel suspension device 5 mounted to the rear frame 21, has no free-moving member and maintains a fixed configuration, transport from a sub-production line to a main production line can be performed easily. Further, since the rear wheel suspension device 5 and the body frame 12 are connected to each other at four locations, mounting of the rear wheel suspension device 5 to the body frame 12 can be performed easily. The drive shaft 72 may be designed such that its one end or the output end 71a is connected to the input shaft 70 in a sub-production line so that the drive shaft 72 constitutes part of the rear wheel suspension unit. Although in the main production line, the left and right mounting brackets 44b are preferably fixed to the mounting stays 44a on the lower pipe members 13a so that the stabilizer 43 is mounted finally, the mounting stays 44a may be provided on the second cross member 28b as described above so that the stabilizer 43 is assembled in a sub-production line.

Since in the off-road vehicle 1 according to this preferred embodiment, rubber cushioning members 35 are provided in the connecting portions of the body frame 12 connected to the rear frame 21, shocks produced when the rear wheel 3 travels over irregularities on the road surface, can be dampened by the rubber cushioning members 35. That is, the shocks transmitted from the rear frame 21 to the body frame 12 are absorbed and minimized by the rubber cushioning members 35.

Further, since in the off-road vehicle 1 according to this preferred embodiment, shocks transmitted from the rear frame 21 (rear wheel suspension device 5) to the body frame 12 are decreased as described above, the connecting portion of the rear wheel suspension device 5 in the body frame 12 (rear end portions of the pipe members 13a, 13b and those of the seat rails 14) can be constructed such that it has the same strength and rigidity as the other portions. Therefore, it is not necessary to adopt a construction which requires partial reinforcement of the body frame 12 and causes a higher cost, thus preventing cost reduction.

Further, since in the off-road vehicle 1 according to this preferred embodiment, deformation of the rubber cushioning members 35 allows dimensional errors of the rear frame 21 and the body frame 12 to be offset, the rear frame 21, and the rear frame mounting portion of the body frame 12 can be manufactured and assembled at a lower cost (to be accurate enough to meet minimum requirements) while the rear wheel suspension device 5 is assembled properly to the body frame 12.

Since the rear wheel suspension device 5 according to preferred embodiments of the present invention is arranged to extend rearward from the rear end of the body frame 12, it can be mounted easily to a body frame on which a swing arm type rear wheel suspension device is mounted, if only the mounting portion is changed, without the need to change the construction of other main parts. Therefore, since welding jigs and other equipment required to form the body frame 12 can be used in common with the body frame provided with the swing arm type rear wheel suspension device, a plurality of vehicles of different types can be manufactured with a minimum capital investment.

Second Preferred Embodiment

Although in the foregoing first preferred embodiment, an example is shown in which both of the inner end of the upper arm 24 and the upper end of the rear cushion unit 26 are preferably connected to the rear frame 21 in assembling the rear wheel suspension unit, either of these end portions may be maintained separate from the rear frame 21 when the rear wheel suspension unit is assembled. In particular, since the upper end of the rear cushion unit 26 being maintained separate from the rear frame 21 in forming the rear wheel suspension unit allows free swinging movement of the upper and lower arms 23, 24, the rear wheel suspension unit can be placed on a provisional platform (not shown), with these arms 23, 24 stretched approximately horizontally and the longitudinal extending portions 27b of the two main pipes 27 located below. As a result, stabilized placement of a rear wheel suspension unit on the platform can be effected when the rear wheel suspension unit is carried from a sub-production line to a main production line.

Third Preferred Embodiment

Although in the foregoing first and second preferred embodiments, an example is shown in which both of the inner end of the upper arm 24 and the upper end of the rear cushion unit 26 are preferably connected to the rear frame 21, a construction may be adopted in which one of these end portions is connected to the rear frame 21 and the other is connected to the body frame 12. Here, an example in which the upper end of the rear cushion unit 26 is connected to the body frame 12 will be described with reference to FIG. 8 and FIG. 9.

Figure 8:
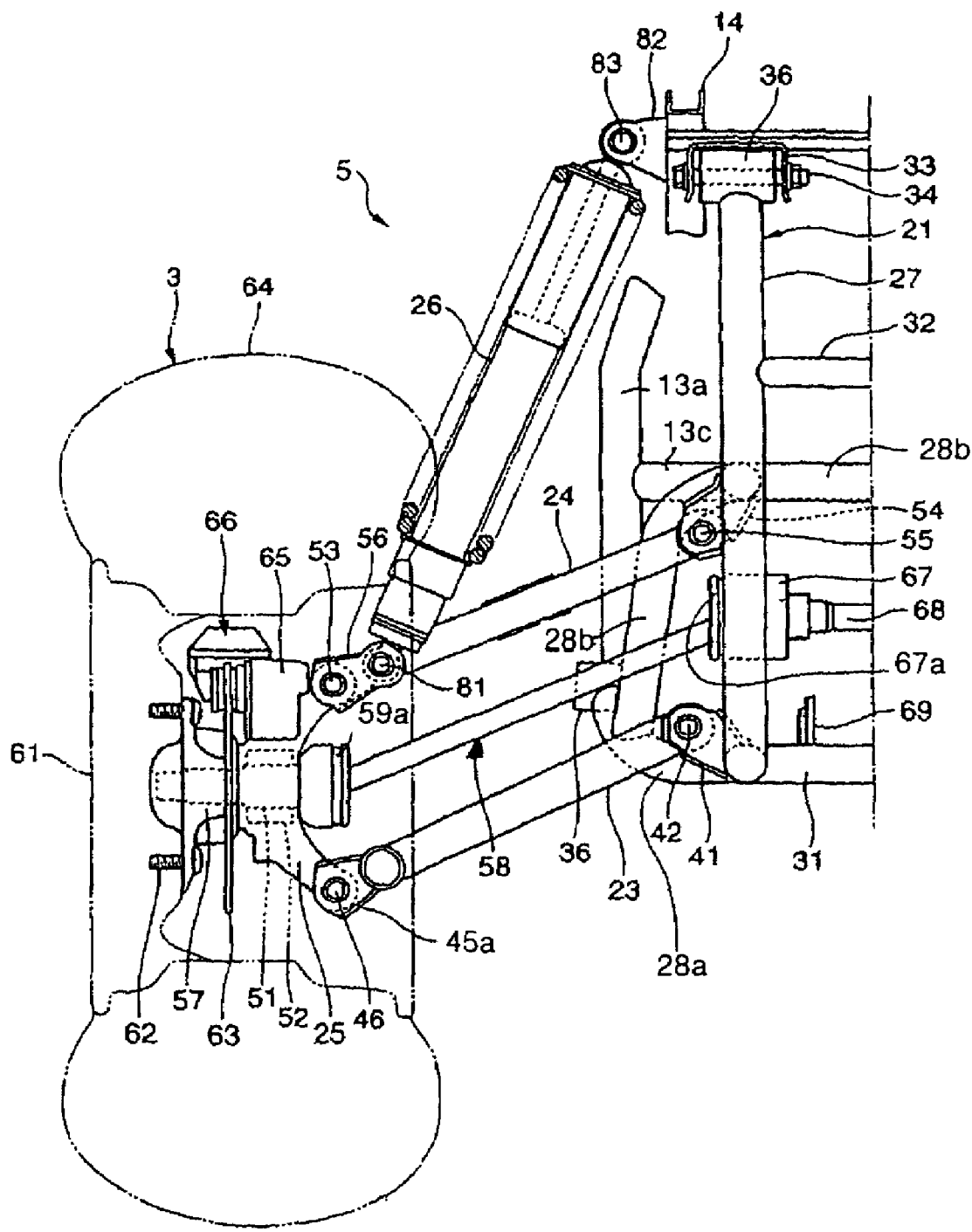
FIG. 8 is a rear view showing another preferred embodiment of the rear wheel suspension device.
Figure 9:
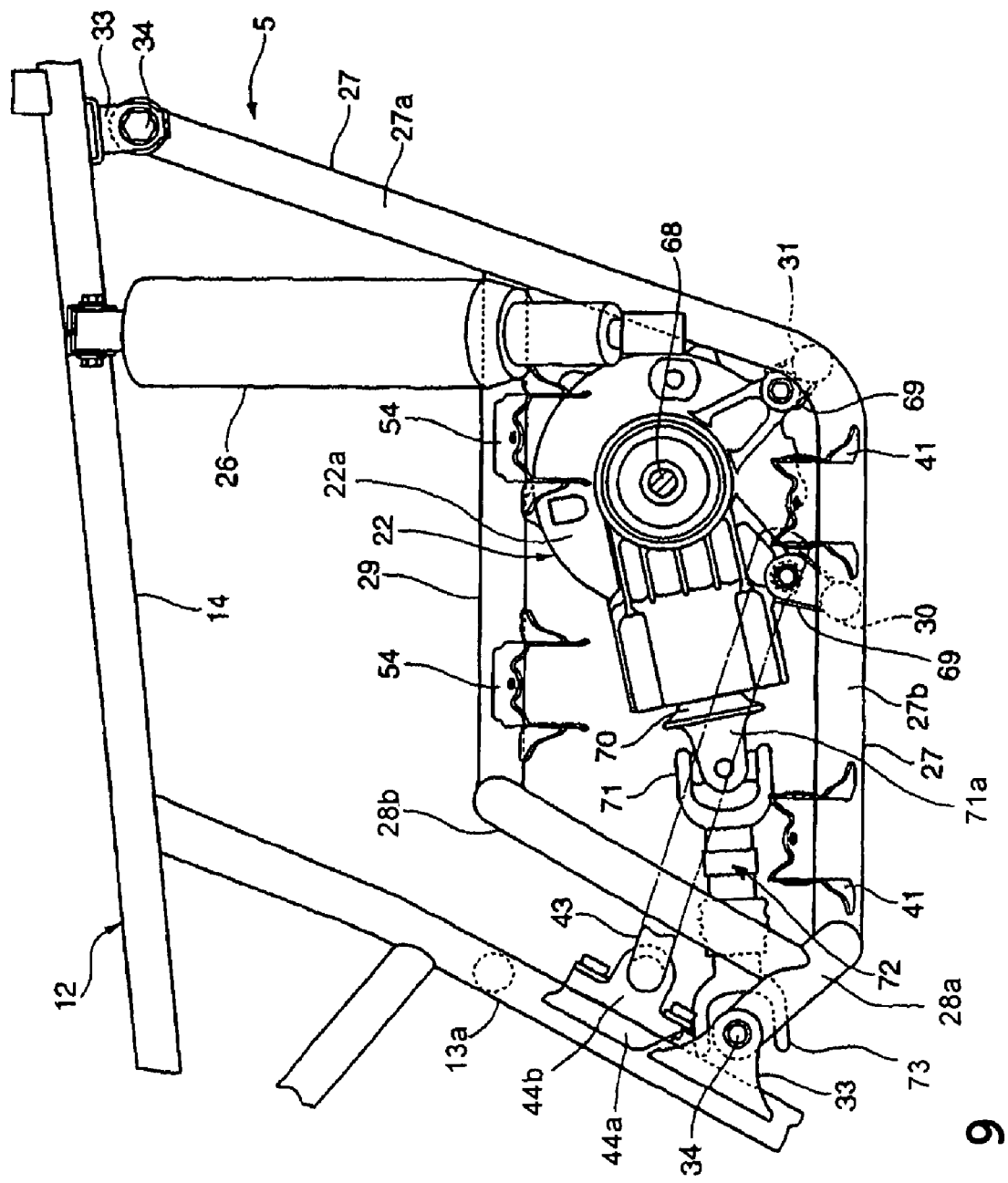
FIG. 9 is a side view of the rear wheel suspension device according to another preferred embodiment of the present invention.

FIG. 8 is a rear view showing another preferred embodiment of the rear wheel suspension device and only the left half of the rear wheel suspension device 5 is depicted in this figure. FIG. 9 is a side view of the rear wheel suspension device according to the other preferred embodiment. In these figures, like or equivalent members described in FIG. 1-FIG. 7 are designated by like reference numerals and detailed description thereof will be omitted as appropriate.

Regarding the rear wheel suspension device 5 shown in FIG. 8 and FIG. 9, the same construction as the rear wheel suspension device 5 shown in FIG. 1-FIG. 7 is preferably adopted except that the mounting portion of the rear cushion unit 26 is different.

The lower end of the rear cushion unit 26 of this preferred embodiment is connected to the upper arm 24 near its connecting portion to the knuckle 25 through a support shaft 81 for pivotal movement in the lateral direction. Also, this upper end of the rear cushion unit 26 is connected to a supporting bracket 82 welded to the seat rail 14 of the body frame 12 through a support shaft 83 for pivotal movement in the lateral direction.

In the rear wheel suspension device 5 according to this preferred embodiment, only the lower end of the rear cushion unit 26 is connected to the upper arm 24 during assembly in a sub-production line, and the upper end of the rear cushion unit 26 is connected to the bracket 26 when the device is mounted to the body frame 12 in a main line.

Since this construction allows free swinging movement of the upper and lower arms 24, 23 during transport of the rear wheel suspension unit, the rear wheel suspension unit can be placed on a provisional platform, with the arms 23, 24 stretched approximately horizontally and the longitudinal extending portions 27b of the two main pipes 27 located below. As a result, stabilized placement of a rear wheel suspension unit on the platform can be effected during transport from a sub-production line to a main production line.

Although in the third preferred embodiment, an example is shown in which the rear cushion unit 26 is mounted at the lower end to the rear frame 21 in advance, the rear cushion unit 26 may be mounted at the upper end to the body frame and at the lower end to the bracket 56. This improves handling properties of the wheel suspension devices coming out from a sub-production line.

Further, both ends of the rear cushion unit 26 may be connected to the rear frame 21 while the upper arm 24 may be connected instead to the body frame 12, on the opposite side from the knuckle 25. In this case, the upper arm 24 may also be assembled to the body frame 12 and the bracket 56 in a main line. This improves handling properties of the wheel suspension devices coming out from a sub-production line.

Although in the third preferred embodiment, the rear cushion unit 26 is preferably not provided with a rubber cushioning member 35 at the upper end or the lower end, a shock-absorbing function and vibration-transmission damping function of the rear cushion unit 26 can be enhanced further if the rubber cushioning member is provided.

Further, if the upper arm 24 is connected to the body frame 12 and the rear cushion unit 26 to the rear frame 21, a rubber cushioning member 35 is preferably provided on the connecting portion in at least one of a bracket corresponding to the bracket 148 and the bracket 56.

As a result of impact forces generated from the rear wheel, any force bypassing the connecting portions of the rear frame 21 and body frame 12 provided with rubber cushioning members 35, is prevented from being transmitted directly to the body frame 12 as a shock.

Further, although in the foregoing first through third preferred embodiments, examples of rear wheel suspension devices embodying the present invention are shown, the wheel suspension device according to the present invention can also be applied to a front wheel suspension device.

Here, the support shaft 53 and support shaft 46 constitute members, each moving up and down relative to the body frame 21, in one unit with either of the upper and lower arms 24, 23. When the upper arm 24, lower arm 23, and both pivot shafts of the support shaft 53 and support shaft 46 are collectively referred to as a swinging member capable of moving up and down relative to the body frame 12, the rear cushion unit 26 may be connected pivotally to the swinging member at any specified location. That is, it may be connected not only to the upper arm 24 or the lower arm 23 but also to the support shaft 53 or the support shaft 46. Further, although the support shaft 53 and support shaft 46 are provided separate from the knuckle 25 or the upper and lower arms 24, 23, they may be formed as parts of the knuckle 25 or the upper and lower arms 24, 23.

Fourth Preferred Embodiment

Figure 10:
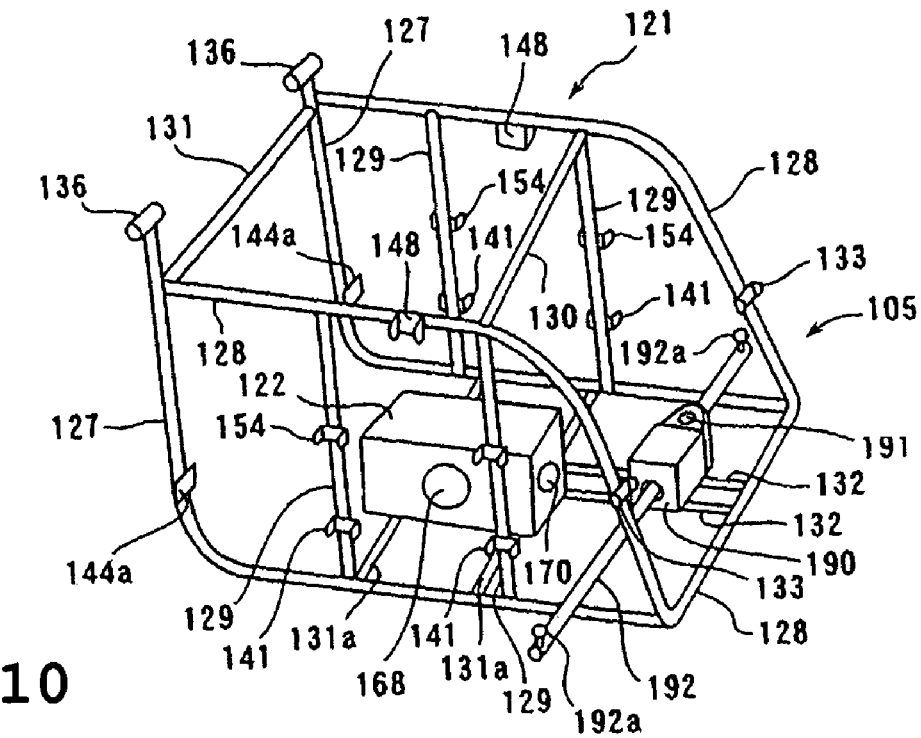
FIG. 10 is a perspective view showing the construction around frames constituting a front wheel suspension device.
Figure 11:
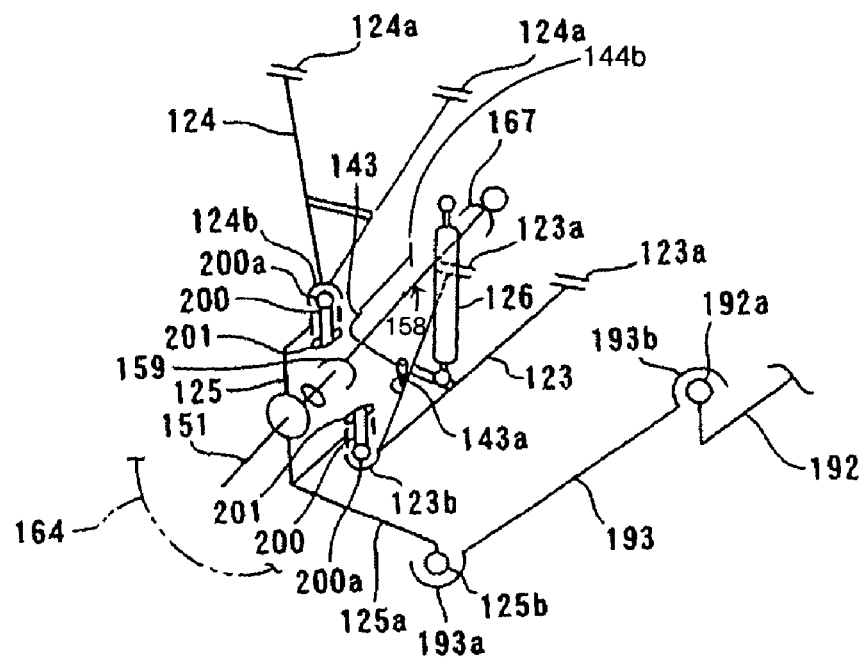
FIG. 11 is a perspective view, showing the construction around moving parts constituting the front wheel suspension device.

FIG. 10 is a perspective view of a front frame 121 constituting a front wheel suspension device according to another preferred embodiment of the present invention, with certain parts mounted thereon. FIG. 11 is a perspective view showing moving parts constituting the front wheel suspension device according to a preferred embodiment of the present invention.

A front frame 121 constituting part of the body frame 12 includes main pipes 127, sub-pipes 128, vertical members 129 connecting the main pipes 127 and sub-pipes 128 on the left and right sides, cross members 130, 131 disposed in the lateral direction, cross members 131a for supporting a front reduction gear device 122, longitudinal members 132, 132 for supporting a rack and pinion assembly 190, a pair of left and right support plates 133 welded to the sub-pipes 128, pipes 136 welded to the forward upper ends of the main pipes 127 and extending laterally, four supporting brackets 154 welded to the upper parts of the left and right vertical members 129, two for each member, four supporting brackets 141 welded to the lower parts of the left and right vertical members 129, two for each member, and a pair of supporting brackets 148 welded to the upper central portions of the left and right sub-pipes 128, one for each pipe. A front frame 121, which constitutes a sub-frame, constituting part of a front wheel suspension device 105 and part of the body frame 12 is connected to the main body frame (not shown) constituting part of a body frame 12. The ends 124a of the upper arms 124 on the front frame 121 side are each connected to the respective supporting brackets 154 through support shafts for pivotal movement in the vertical direction.

A kingpin 200 is screwed into the top of the knuckle 125 from above and supported fixedly on the knuckle 125 through a nut 201 screwed into the kingpin 200 from below. A ball joint formed on the upper arm 124 at the wheel side end 124b is fitted on a ball portion 200a formed on the top of the kingpin 200. This allows rotational movement of the knuckle 125 relative to the upper arm 124 through the kingpin 200, with the degree of freedom of two directions, lateral and vertical.

Ends 123a of the lower arm 123 on the front frame 121 side are connected to the supporting brackets 141 through support shafts for pivotal movement in the vertical direction, respectively. The left and right lower arms 123 are connected together through a stabilizer 143, and a link 143a provided, at one end, with a ball joint and, at the other end, with a cylindrical joint. At two locations arranged centrally of the stabilizer, mounting brackets 144b supporting the stabilizer 143 for rotational movement are fixed to mounting stays 144a mounted on the respective main pipes 127 by welding.

A kingpin 200 is screwed into the bottom of the knuckle 125 from below and supported fixedly on the knuckle 125 through a nut 201 screwed into the kingpin 200 from above. A ball joint formed on the lower arm 123 at the wheel side end 123b is fitted on a ball portion 200a formed on the bottom of the kingpin 200. This allows rotational movement of the knuckle 125 relative to the lower arm 123 through the kingpin 200, with the degree of freedom of two directions, lateral and vertical.

The rack and pinion assembly 190 is supported by the cross members 132 slightly rightward of the laterally central portion of the front frame. The rack and pinion assembly 190 is provided with an input shaft 191 to which a steering shaft is connected, and a pinion at the lower end of the input shaft 191. The rack and pinion assembly 190 is provided centrally with a rack meshing the pinion, and a rack shaft 192 disposed extending in the lateral direction. The rack shaft 192 is provided, at both ends, with ball portions 192a.

On the other hand, the knuckle 125 is provided with a knuckle arm 125a formed integrally and extending rearward, and the knuckle arm 125a is provided, at the leading end, with a ball portion 125b. On the ball portion 125b and ball portion 192a of the rack shaft 192 are fitted ball joints 193a, 193b provided at both ends of the tie rod 193, respectively. During the steering operation, turning movement of the steering shaft is converted into the lateral movement of the rack shaft 192, this movement is transmitted through the tie rod 193 to the knuckle 125 supporting a front wheel 164 through a front axle 151, and the knuckle 125 is turned about the axis passing through the upper and lower kingpins 200, for steering.

On either of the left and right sides, a front cushion unit 126 is mounted between the lower arm 123 and supporting bracket 148 on the sub-pipe 128.

The connecting method of the upper and lower arms 123, 124 and the front cushion unit 126 to the respective supporting brackets 154, 141 and 148 is preferably the same as the method of connecting the upper and lower arms 23, 24 of the rear wheel suspension device 5 and the rear cushion unit 26 to the respective supporting brackets 54, 41 and 48. Detailed description is therefore omitted.

Between the output shaft 168 of the front reduction gear device 122 and the front axle 151 supported on the knuckle 124 for rotation and having the front wheel 161 mounted thereon is mounted a transmission shaft 158 having universal joints 167, 159 provided at both ends, on either of the left and right sides. Between the knuckle 125 and front axle 151, a front brake device is provided, which is preferably the same as the rear brake device 66.

The front wheel suspension device 105 is assembled in a sub-production line and includes the front reduction gear device 122, rack and pinion assembly 190, left and right upper arms 124, left and right lower arms 123, left and right front cushion units 126, left and right knuckles 125, left and right tie rods 193, left and right front axles 151, left and right transmission shafts 158, left and right front wheels 164, left and right front brake devices and stabilizer 143 assembled to the front frame 121.

The front wheel suspension unit as an assembly of these parts is assembled to the front of the body frame 12 from below in a main production line. The pipes 136 on the main pipes 127 are connected to the pair of left and right support plates 133 on the body frame 12 through fixing bolts, rubber cushioning members and other suitable elements, which are preferably the same as those for the rear wheel suspension unit, and support plates 133 on the sub-pipes are connected to the pair of left and right pipes on the body frame 12 in the same manner.

After completion of the connection and assembly as described above, a steering shaft is connected to the input shaft 191 of the rack and pinion assembly 190 and the drive shaft from the engine 4 is connected to the input shaft 170 of the front reduction gear device 122.

The drive shaft may be connected to the input shaft 170 of the front reduction gear device 122 in a sub-production line in advance so that it is connected to the engine 4 in a main production line.

The effects and advantages of the front wheel suspension device 105 are the same as those of the rear wheel suspension device 5 in the first preferred embodiment. If modifications are made, which are preferably the same as in the second or the third preferred embodiment of the rear wheel suspension device, the same effects and advantages can also be achieved in the front wheel suspension device.

In the first through fourth preferred embodiments, examples of four-wheel drive type off-road vehicles embodying the present invention are shown. However, in the case of two-wheel drive type vehicles, in a front wheel suspension device for a non-drive wheel, or a rear wheel suspension device, the front reduction gear device 122 and both the transmission shafts 158 are eliminated or the rear reduction gear device 22 and both the transmission shafts 58 are eliminated, and the knuckle 125 is integrated with the axle 151 or the knuckle 25 is integrated with the axle 51. The present invention is also applicable to the front wheel suspension device 9 for a non-drive wheel or the rear wheel suspension device 5. Further, the present invention is also applicable to vehicles of a two-wheel independent suspension type. Furthermore, the present invention is applicable to vehicles in which a differential gear device is provided in place of the front reduction gear device 122 or the rear reduction gear device 22.

In the rear wheel suspension device, the lower end of the cushion unit 26 may be connected for pivotal movement, not to the upper arm 24 or the lower arm 23, but to either of the support shafts 81 for connecting the wheel side ends of the upper arm 24 and lower arm 23 to the knuckle 25.

Likewise, as shown in the fourth preferred embodiment, in a front wheel suspension device utilizing ball joints for connecting the wheel side ends of an upper arm 124 and a lower arm 123 to a knuckle 125, the upper arm 124 and lower arm 123 constitute a swinging member. The lower end of a front cushion unit 126 may be connected, not to the lower arm 123, but to the upper arm 124 for pivotal movement. Also, in a front wheel suspension device in which, for the wheel side ends of the upper arm 124 and the lower arm 123 to be connected to the knuckle 125 for pivotal movement in the vertical and the lateral direction, respectively, the upper and lower arms 123, 124 and the knuckle 125 are connected through intermediate members, the upper and lower arms 123, 124 and the intermediate members are connected by pivot shafts for the pivotal movement in the vertical direction, respectively, and the intermediate members and the knuckle 125 are connected by pivot shafts for the pivotal movement in the lateral direction, respectively, the upper arm 124, the lower arm 123 and the pivot shafts for the pivotal movement in the vertical direction constitute a swinging member. In a front wheel suspension device in which the upper and lower arms 123, 124 and intermediate members are connected by pivot shafts for the pivotal movement in the lateral direction, and the intermediate members and knuckle 125 are connected by pivot shafts for the pivotal movement in the vertical direction, the upper arm 124 and the lower arm 123 constitute a swinging member.

Further, although in the first through fourth preferred embodiments, connection to the rear frame 21 (or front frame 121) as a sub-frame of the upper and lower arms 24, 23 (or 124, 123) is performed at the longitudinally spaced supporting brackets 54 (or 154) and the supporting brackets 41 (or 141), connection to the rear frame 21 (or the front frame 121) may be performed at one location for either of the upper arm 24 (or 124) and the lower arm 23 (or 123). That is, either the supporting bracket 54 (or 154) or 41 (or 141) can be eliminated as well as either the corresponding support shaft 55 (or 155) or 42 (or 142).

Although in the foregoing first through fourth preferred embodiments, examples are shown in which rubber cushioning members 35 are provided in the connecting portions of the main body frame 12A and the rear frame 21 (or the front frame 121), the rubber cushioning members 35 may be provided on the upper and lower arms 24, 23 (or 124, 123) rather than in the foregoing connecting portions, or may be provided both in the connecting portions and on the upper and lower arms 24, 23 (or 124, 123). If the rubber cushioning members 35 are provided on the upper and lower arms 24, 23 (or 124, 123), a rubber cushioning member 35 is provided in at least either of the inner and outer connecting portions of the lower arm 23 (or 123) and a rubber cushioning member 35 is provided in at least either of the inner and outer connecting portions of the upper arm 24 (or 124). The rubber cushioning member 35 may also be provided in at least one of the connecting portions of the rear cushion unit 26 (or the front cushion unit 126) at the upper and lower ends.

Even if rubber cushioning members 35 are provided on the arms 23, 24 (or arms 123, 124) or on the cushion unit 26 (or the front cushion unit 126), shocks transmitted from the rear wheel suspension device 5 to the body frame 12 can be minimized as in the foregoing preferred embodiment.

This invention can also be applied to golf carts, ATVs, automobiles or other vehicles.

While preferred embodiments of the present invention have been described above, it is to be understood that variations and modifications will be apparent to those skilled in the art without departing the scope and spirit of the present invention. The scope of the present invention, therefore, is to be determined solely by the following claims.

What is claimed is:

1. A vehicle comprising:
a body frame including a main body frame and a separate sub-frame connected to the main body frame;
wheel suspension devices supporting the body frame, the wheel suspension devices being provided on left and right sides of the vehicle, the wheel suspension devices including:
the sub-frame;
left and right lower arms each having a first end supported on the sub-frame for pivotal movement in a vertical direction and a second end extending outward from a side of the sub-frame;
left and right knuckles each connected to the second end of the left and right lower arms, respectively, for pivotal movement in the vertical direction and arranged to support a wheel for rotation; and
left and right upper arms each having a first end connected for pivotal movement in the vertical direction to the left and right knuckles, respectively, at a position above a connection portion connecting the left and right knuckles and the left and right lower arms, respectively, and extending inward from the first end;
the body frame including the left and right elongated cushion units each having a first longitudinal end pivotally connected for pivotal movement to the left and right lower arms at a location inward from the second ends of the left and right lower arms; wherein second ends of said left and right upper arms and second longitudinal ends of said left and right cushion units are pivotally connected to said body frame and at least one of said second ends of said left and right upper arms and said second longitudinal ends of said left and right cushion units is pivotally connected to said sub-frame; and the sub-frame includes at least one connection member connecting the sub-frame to the main body frame and arranged to allow the sub-frame to pivot about a horizontal axis with respect to the main body frame.

2. The vehicle according to claim 1, wherein said sub-frame is connected detachably to said main body frame.

3. The vehicle according to claim 1, wherein the at least one connection member includes a shock-absorbing member made of rubber.

4. The vehicle according to claim 1, wherein the second ends of said left and right upper arms and said left and right cushion units are each connected to said sub-frame.

5. The vehicle according to claim 1, wherein if said at least one of said second ends of said left and right upper arms and said left and right cushion units is not connected to the sub-frame, the other of said at least one of said second ends of said left and right upper arms and said left and right cushion units is connected to the main body frame, in at least one of said left and right upper arms and said left and right cushion units, the second ends of which are connected to the body frame, a vibration-preventing member made of rubber is provided in at least one of connecting portions at the first end and at the second end, and a vibration-preventing member made of rubber is provided in the connecting portion of the sub-frame that is connected to the main body frame.

6. The vehicle according to claim 1, further comprising a power distribution device including an input shaft connected to an engine, a pair of left and right output shafts each connected to respective left and right wheels, a gear device arranged to transmit rotation of said input shaft to the output shafts, and a casing member arranged to support said gear device, input shaft and output shafts for rotation, the power distribution device being provided on said sub-frame.

7. The vehicle according to claim 1, wherein said knuckle supports a rear wheel for rotation.

8. The vehicle according to claim 1, wherein said knuckle supports a front wheel rotatably and is connected to said second ends of the left and right upper and lower arms for pivotal movement in the vertical direction and in the lateral direction, and a steering device is connected to said knuckle.

9. The vehicle according to claim 8, wherein a casing member supporting a rotational shaft for rotation is mounted to said sub-frame, said rotational shaft is arranged to receive a steering force at a top thereof and having at a bottom thereof a pitman arm for turning said knuckle through a tie rod to the left and right mounted thereon.

10. A wheel suspension device provided on a main body frame constituting part of a body of a vehicle and supporting the body of the vehicle, said wheel suspension device comprising:

a sub-frame connectable to said main body frame;

left and right lower arms each having a first end supported on the sub-frame for pivotal movement in a vertical direction and a second end extending outward from a side of the sub-frame;

left and right knuckles each connected to the second end of the left and right lower arms for pivotal movement in the vertical direction and arranged to support a wheel for rotation;

left and right upper arms each having a first end connectable for pivotal movement in the vertical direction to the left and right knuckles, respectively, at a position above a connecting portion of the knuckle; and elongated left and right cushion units having first longitudinal ends pivotally connectable to a body frame made up of said sub-frame and said main body frame; wherein the left and right upper arms are connected at a second end to said sub-frame for pivotal movement in the vertical direction, and the left and right cushion units are pivotally connected at second longitudinal ends to the left and right lower arms at a location inward from the second ends of the left and right lower; and the sub-frame includes at least one connection member connecting the sub-frame to the main body frame and arranged to allow the sub-frame to pivot about a horizontal axis with respect to the main body frame.

11. The wheel suspension device according to claim 10, wherein a power distribution device including an input shaft connected to an engine for supplying power to said vehicle, a pair of left and right output shafts each connected to the respective left and right wheels, a gear device for transmitting the rotation of said input shaft to the output shafts, and a casing member for supporting said gear device, input shaft and output shafts for rotation, is provided on said sub-frame.

12. The wheel suspension device according to claim 10, wherein said knuckle supports the rear wheel rotatably.

13. A method of assembling a vehicle comprising the steps of:

connecting inner ends of left and right lower arms to a sub-frame;

connecting lower ends of left and right knuckles to outer ends of the left and right lower arms, respectively, and connecting upper ends of the left and right knuckles to outer ends of left and right upper arms;

pivotally connecting first longitudinal ends of elongated left and right cushion units to said left and right lower arms at a location inward from the outer ends of said left and right lower arms, respectively, and pivotally connecting at least either one of inner ends of said upper arms and upper longitudinal ends of said cushion units to said sub-frame, to define a wheel suspension unit;

thereafter assembling the sub-frame of the wheel suspension unit to a body frame such that the sub-frame is arranged to pivot in a vertical direction with respect to the body frame; and then if the inner ends of said upper arms or the upper ends of said cushion units are not connected to the sub-frame, the inner ends or the upper ends, which are not connected to the sub-frame, are connected to the body frame.

* * * * *